(12) United States Patent
Kone

(10) Patent No.: US 8,724,550 B2
(45) Date of Patent: May 13, 2014

(54) APPARATUSES AND METHODS FOR HANDLING SECONDARY CELL (SCELL) REACTIVATION

(75) Inventor: Mamadou Kone, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 96 days.

(21) Appl. No.: 13/372,139

(22) Filed: Feb. 13, 2012

(65) Prior Publication Data

US 2012/0207089 A1   Aug. 16, 2012

Related U.S. Application Data

(60) Provisional application No. 61/442,459, filed on Feb. 14, 2011.

(51) Int. Cl.
*H04W 4/00* (2009.01)
(52) U.S. Cl.
USPC .......................................... 370/328; 370/329
(58) Field of Classification Search
None
See application file for complete search history.

(56) References Cited

U.S. PATENT DOCUMENTS

2007/0191010 A1* 8/2007 Kim et al. ..................... 455/436
2011/0134774 A1* 6/2011 Pelletier et al. ............... 370/252
2011/0158117 A1* 6/2011 Ho et al. ....................... 370/252

* cited by examiner

*Primary Examiner* — David Oveissi
(74) *Attorney, Agent, or Firm* — Birch, Stewart, Kolasch & Birch, LLP

(57) ABSTRACT

A method for handling Secondary Cell (SCell) reactivation by a mobile communication device supporting a Carrier Aggregation (CA) technique is provided. The method includes the following steps: receiving at least one Media Access Control (MAC) Control Element (CE) indicating activation of an already activated SCell with configured uplink from a service network, comparing an accumulated number of the at least one MAC CE with a predetermined number, and ignoring the MAC CE for the already activated SCell with configured uplink in response to the accumulated number of the at least one MAC CE being greater than or equal to the predetermined number.

2 Claims, 12 Drawing Sheets

APPARATUSES AND METHODS FOR HANDLING SECONDARY CELL (SCELL) REACTIVATION

CROSS REFERENCE TO RELATED APPLICATIONS

This Application claims the benefit of U.S. Provisional Application No. 61/442,459, filed on Feb. 14, 2011, the entirety of which is incorporated by reference herein.

BACKGROUND OF THE INVENTION

1. Field of the Invention

The invention generally relates to the handling of Secondary Cell (SCell) reactivation, and more particularly, to apparatuses and methods for handling reactivation of an activated SCell with configured uplink, so as to avoid unnecessary triggering of the Power Headroom Reporting (PHR) procedure and to avoid resetting associated timers.

2. Description of the Related Art

In order to meet user demand for higher data rates in wireless communications, support for wider transmission bandwidths is required. A so-called Carrier Aggregation (CA) technique has been proposed to allow expansion of effective bandwidths delivered to a User Equipment (UE) through concurrent utilization of radio resources across multiple carriers. The CA technique is most useful when it is difficult to derive a contiguous and extra wide bandwidth. With the CA technique, more than 2 frequency bands may be aggregated to form a larger transmission/receive bandwidth. Each of the aggregated frequency channels is generally referred to as a Component Carrier (CC), which may be taken as a component of the aggregated bandwidth.

Taking the Long Term Evolution (LTE) technology in compliance with release 10 of the 3rd Generation Partnership Project (3GPP) technical specifications as an example, a UE may have one Primary CC (also referred to as PCell) and up to 4 Secondary CCs (also referred to as SCells), and each of the SCells needs to be configured and activated before it may be used for data transmission or reception. An LIE system may first transmit a Radio Resource Control (RRC) message to configure the SCell(s) for the UE, and then activate the SCell(s) by dedicated signaling, such as an Activation/Deactivation Medium Access Control (MAC) Control Element (CE). Later, if a smaller transmission bandwidth is required instead, the LIE system may transmit another Activation/Deactivation MAC CE to the UE to deactivate one of the activated SCell(s). In addition, a deactivation timer may be maintained both in the network side and the UE to count a predetermined time period when the corresponding activated SCell may stay activated. When the deactivation timer expires, the LTE system and the UE may deactivate the corresponding SCell to save power consumed for monitoring the physical downlink shared channel (PDSCH) and physical downlink control channel (PDCCH) corresponding to the deactivated SCell.

Meanwhile, in a mobile communication system supporting the CA technique, how to efficiently distribute/allocate uplink transmission resources between multiple UEs is always a critical issue from the viewpoint of the network side. For better radio resource management, the Power Headroom Reporting (PHR) procedure has been introduced for enabling the UEs to provide specific power status information to the network side. Specifically, the report includes information about the difference between the nominal UE maximum transmit power and the estimated power for UpLink-Shared Channel (UL-SCH) transmission per activated SCell and also information about the difference between the nominal UE maximum power and the estimated power for UL-SCH and PUCCH transmission on the PCell. The reported information is especially important for the network side when allocating the transmission format (bandwidth and modulation and coding scheme) to different UEs. The network entity (eNB) can use the reported information to determine how much more uplink bandwidth per subframe a UE is capable of using, so as to avoid allocating uplink transmission resources to UEs which are unable to use them. Thus, the Signal to Interference-plus-Noise Ratio (SINR) may be decreased and the system capacity may be improved.

BRIEF SUMMARY OF THE INVENTION

In one aspect of the invention, a method for handling SCell reactivation by a mobile communication device supporting a CA technique is provided. The method comprises the steps of: receiving at least one MAC CE indicating activation of an already activated SCell with configured uplink from a service network; comparing an accumulated number of the at least one MAC CE with a predetermined number; and ignoring the MAC CE for the already activated SCell with configured uplink in response to the accumulated number of the at least one MAC CE being greater than or equal to the predetermined number.

In another aspect of the invention, a method for handling SCell reactivation by a mobile communication device supporting a CA technique is provided. The method comprises the steps of: receiving a MAC CE indicating activation of an already activated SCell with configured uplink from a service network; determining whether the MAC CE also indicates activation of a deactivated SCell; and not restarting a prohibition timer for a PHR procedure in response to the MAC CE not indicating activation of the deactivated SCell.

In yet another aspect of the invention, a method for handling SCell reactivation by a mobile communication device supporting a CA technique is provided. The method comprises the steps of: receiving a MAC CE from a service network; determining whether the MAC CE indicates activation of an already activated SCell with configured uplink; and not restarting a deactivation timer associated with the already activated SCell with configured uplink in response to the MAC CE indicating activation of the already activated SCell with configured uplink.

Other aspects and features of the invention will become apparent to those with ordinary skill in the art upon review of the following descriptions of specific embodiments of the mobile communication devices and the methods for handling SCell reactivation.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP technical specifications are used to teach the spirit of the invention, and the invention is not limited thereto.

According to release 10 of the 3GPP technical specifications, the PHR procedure will be triggered for several events: 1) when the prohibitPHR-Timer expires or has expired and the path loss has changed more than dl-PathlossChange dB for at least one activated SCell which is used as a pathloss reference since the last transmission of a PHR when the UE has UL resources for a new transmission; 2) when the periodicPHR-Timer expires; 3) upon configuration or reconfiguration of the power headroom reporting functionality by the upper layers, which is not used to disable the function; and 4) upon activation of an SCell with configured uplink. It is noted that, due to the format design of the Activation/Deactivation MAC CE, the network side will inevitably reactivate the already activated SCell(s) if it wishes to deactivate a certain SCell or activate a deactivated SCell among a plurality of activated SCells. When receiving such an Activation/Deactivation MAC CE, the UE will accordingly restart the deactivation timer (i.e., the sCellDeactivationTimer) for each reactivated SCell, which would result in the unnecessary prolonging of the activation period for each reactivated SCell. Also, the PHR procedure will be triggered every time when the UE receives such an Activation/Deactivation MAC CE to activate an SCell with configured uplink (referring to the PHR trigger event 4), and the PHR prohibition timer (i.e., the prohibitPHR-Timer) will be started. Thus, impact to the UE performance may be caused, such as unnecessary power consumption due to the frequent triggering of the PHR trigger event 4, and inappropriate prevention of other PHR trigger events (referring to the PHR trigger events 1 to 3) due to the PHR prohibition timer being frequently restarted by the PHR trigger event 4.

Figure 1:
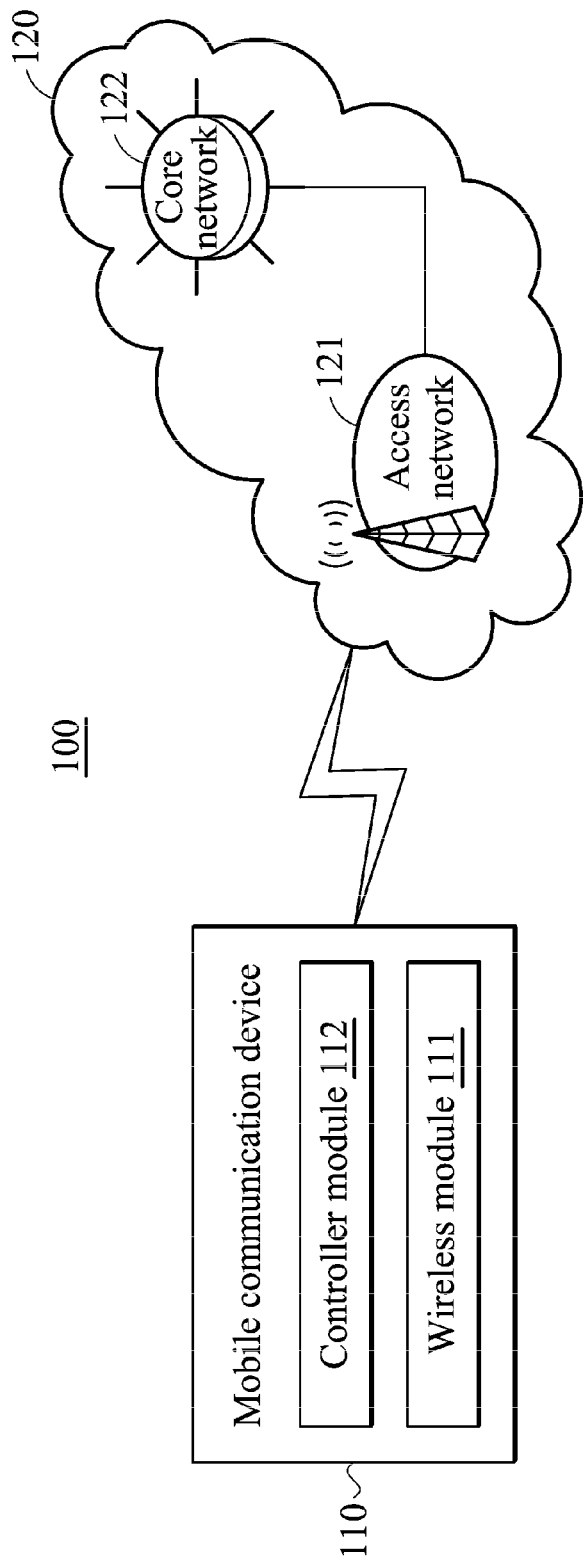
FIG. 1 is a block diagram illustrating a mobile communication environment according to an embodiment of the invention.

In order to solve the aforementioned problems, the invention proposes apparatuses and methods for handling SCell reactivation with limited triggering of the PHR procedure and limited extension of the activation period for each reactivated SCell. FIG. 1 is a block diagram illustrating a mobile communication environment according to an embodiment of the invention. In the mobile communication environment 100, the mobile communication device 110 is wirelessly connected to the service network 120 for obtaining wireless services. The service network 120 may comprise an access network 121 and a core network 122, wherein the access network 121 may be an Evolved Universal Terrestrial Radio Access Network (E-UTRAN) in the LTE/LTE-Advanced technology, and the core network 122 may be an Evolved Packet Core (EPC) in the LTE/LTE-Advanced technology. The mobile communication device 110 comprises a wireless module 111 for performing the functionality of wireless transmissions and receptions to and from the service network 120, and a controller module 112 for controlling the operation of the wireless module 111 and other functional components, such as a display unit and/or keypad serving as the MMI (man-machine interface), a storage unit storing the program codes of the applications or communication protocols of the LTE/LTE-Advanced technology, or others. To further clarify, the wireless module 111 may be a radio frequency (RF) unit, and the controller module 112 may be a general-purpose processor or a micro-control unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 2100 MHz, or 2.6 GHz utilized in the LTE/LTE-Advanced systems, or others depending on the Radio Access Technology (RAT) in use.

Figure 2A:
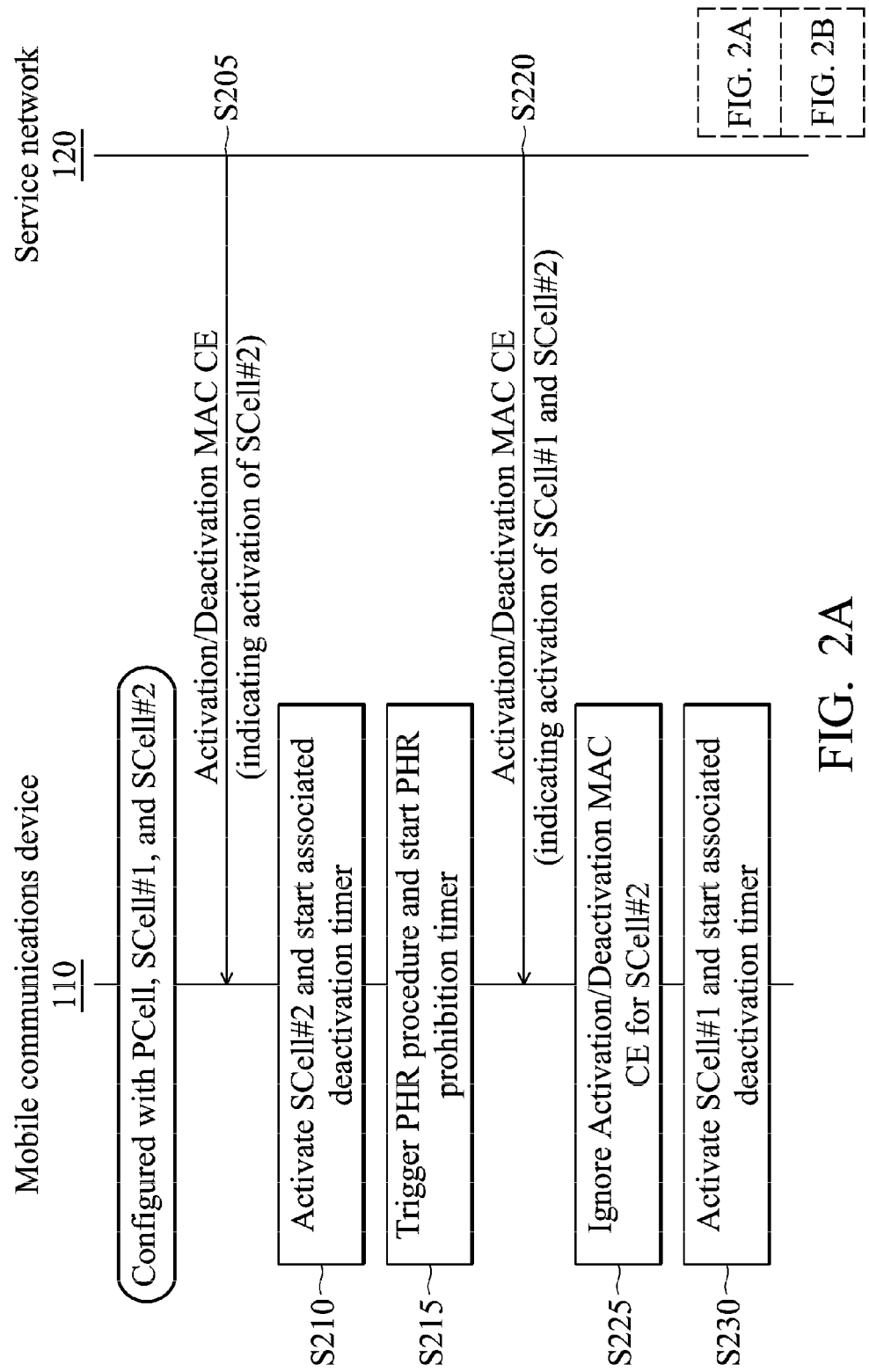
FIGS. 2A and 2B show a message sequence chart illustrating the handling of the SCell reactivation according to an embodiment of the invention.
Figure 2B:
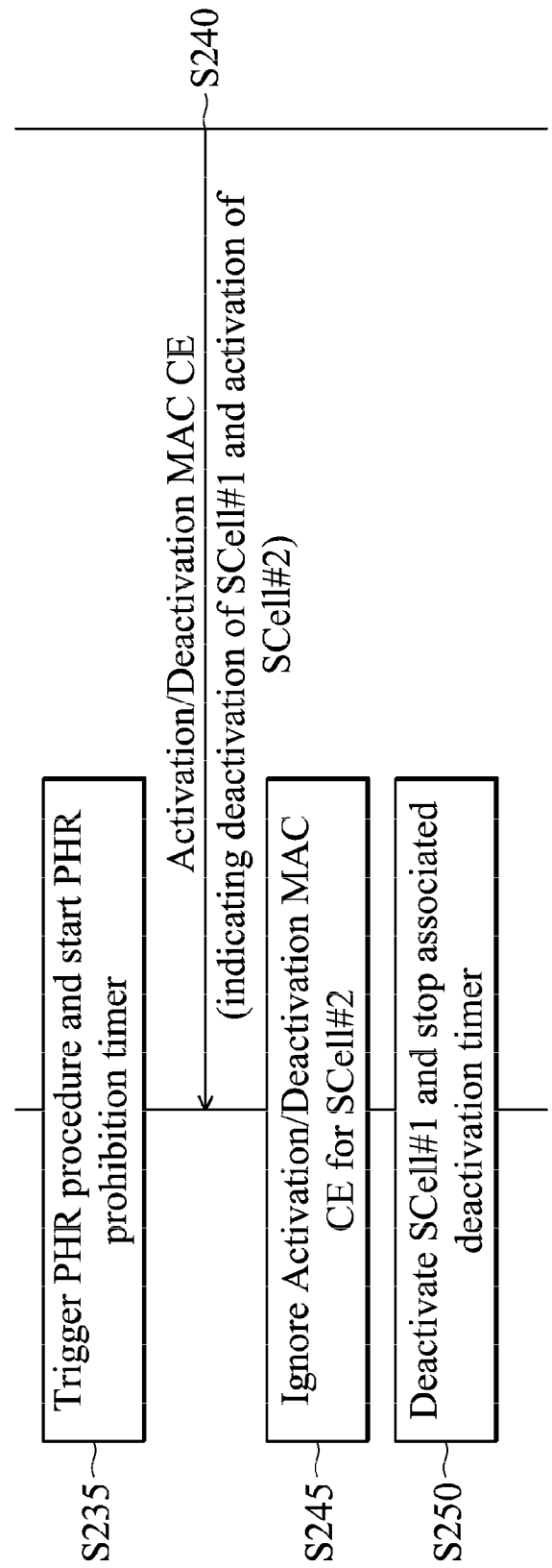

To be more specific, the controller module 112 controls the wireless module 111 for handling SCell reactivation. FIGS. 2A and 2B show a message sequence chart illustrating the handling of the SCell reactivation according to an embodiment of the invention. In this embodiment, one CC is configured as the PCell and two CCs are configured as the SCells with uplink (denoted as SCell#1 and SCell#2) for the wireless communications device 110. Note that the PCell is always activated, while SCell#1 and SCell#2 are initially deactivated. When the service network 120 detects that a larger transmission bandwidth is required for the mobile communication device 110, it transmits an Activation/Deactivation MAC CE indicating activation of an SCell with configured uplink, say SCell#2, to the mobile communication device 110 (step S205). When receiving the Activation/Deactivation MAC CE, the controller module 112 activates SCell#2 and starts the deactivation timer associated with SCell#2 (step S210). Meanwhile, the controller module 112 also triggers the PHR procedure and starts the prohibition timer for the PHR procedure (i.e., the PHR prohibition timer) (step S215). During the running period of the PHR prohibition timer, the mobile communication device 110 is forbidden to perform the PHR procedure, so as to avoid frequent triggering of the PHR procedure. Subsequently, the service network 120 detects that a larger transmission bandwidth is again required for the mobile communication device 110. Since the format design of the Activation/Deactivation MAC CE only provides control of the SCell with either activation or deactivation, the service network 120 has no choice but to transmit another Activation/Deactivation MAC CE to the mobile communication device 110, which indicates activation of another SCell with configured uplink, say SCell#1, and also indicates activation of the already activated SCell#2 to keep SCell#2 activated (step S220). Due to the fact that the second Activation/Deactivation MAC CE is only used for activation of the originally deactivated SCell#1 and is irrelevant to SCell#2, the controller module 112 ignores the Activation/Deactivation MAC CE for SCell#2 (step S225). In other words, the deactivation timer associated with SCell#2 is not restarted.

The controller module 112 continues to handle the Activation/Deactivation MAC CE for SCell#1. Specifically, the controller module 112 activates SCell#1 and starts the deactivation timer for SCell#1 (step S230). In response to the activation of SCell#1, the controller module 112 triggers the PHR procedure and starts the prohibition timer for the PHR procedure (step S235). Next, when the service network 120 detects that a smaller transmission bandwidth is required for the mobile communication device 110, it transmits an Activation/Deactivation MAC CE to the mobile communication device 110, which indicates deactivation of SCell#1 and activation of the already activated SCell#2 to keep SCell#2 activated (step S240). Due to the fact that the Activation/Deactivation MAC CE is used for deactivation of SCell#1 only and is irrelevant to SCell#2, the controller module 112 ignores the Activation/Deactivation MAC CE for SCell#2 (step S245). In other words, the deactivation timer associated with SCell#2 is not restarted. After that, the controller module 112 continues to handle the Activation/Deactivation MAC CE for SCell#1 by deactivating SCell#1 and stopping the deactivation timer associated with SCell#1 (step S250). Note that, the controller module 112 ignores the Activation/Deactivation MAC CE for the already activated SCell, so that unnecessary prolonging of the activation period of the already activated SCell may be avoided and the PHR procedure triggered by an Activation/Deactivation MAC CE indicating activation of an already activated SCell does not exclude other PHR trigger events (especially the PHR trigger events that are useful to the UE scheduler).

Figure 3A:
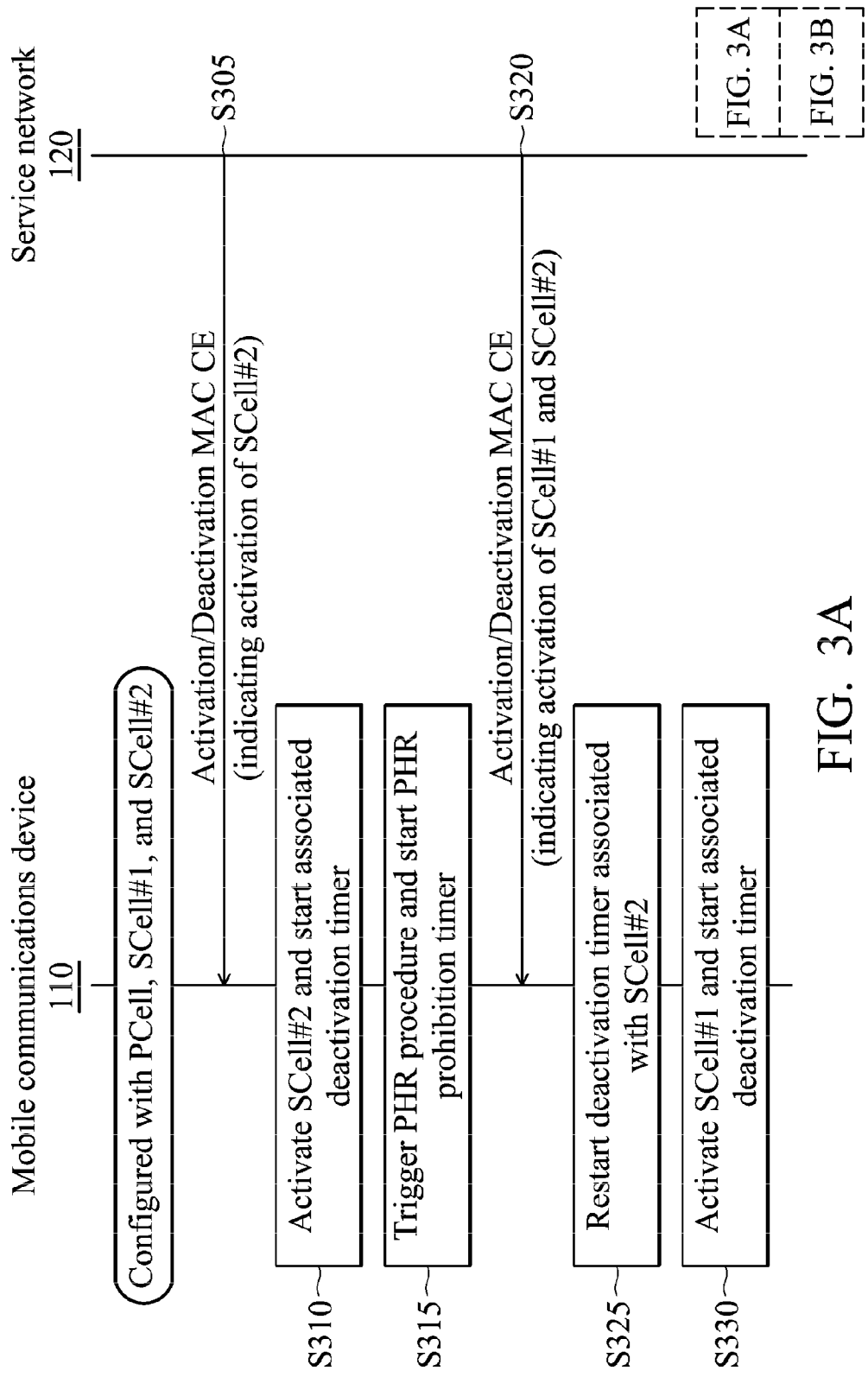
FIGS. 3A and 3B show a message sequence chart illustrating the handling of the SCell reactivation according to another embodiment of the invention.
Figure 3B:
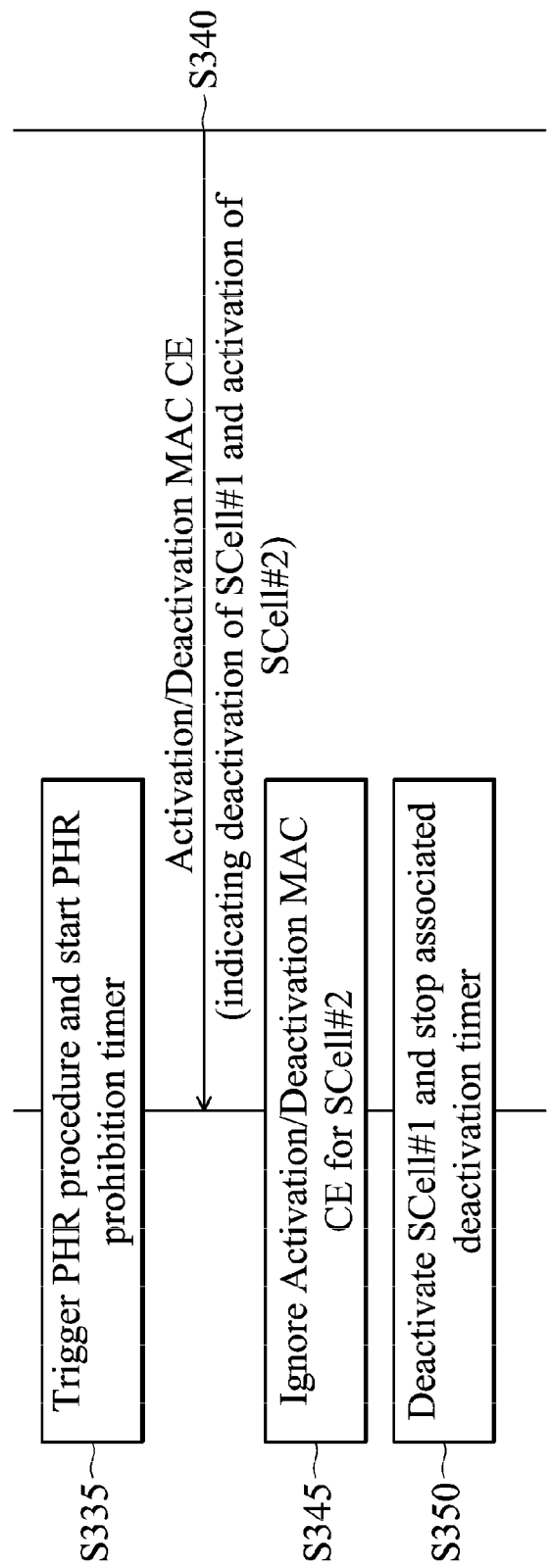

FIGS. 3A and 3B show a message sequence chart illustrating the handling of the SCell reactivation according to another embodiment of the invention. Similar to FIGS. 2A and 2B, one CC is configured as the PCell and two CCs are configured as the SCells with uplink (denoted as SCell#1 and SCell#2) for the wireless communications device 110, and the PCell is always activated while SCell#1 and SCell#2 are initially deactivated. When the service network 120 detects that a larger transmission bandwidth is required for the mobile communication device 110, it transmits an Activation/Deactivation MAC CE indicating activation of an SCell with configured uplink, say SCell#2, to the mobile communication device 110 (step S305). When receiving the Activation/Deactivation MAC CE, the controller module 112 activates SCell#2 and starts the deactivation timer associated with SCell#2 (step S310). Meanwhile, the controller module 112 also triggers the PHR procedure and starts the prohibition timer for the PHR procedure (step S315). During the running period of the PHR prohibition timer, the mobile communication device 110 is forbidden to perform the PHR procedure, so as to avoid frequent triggering of the PHR procedure. Subsequently, the service network 120 detects that a larger transmission bandwidth is again required for the mobile communication device 110. Since the format design of the Activation/Deactivation MAC CE only provides control of the SCell with either activation or deactivation, the service network 120 has no choice but to transmit another Activation/Deactivation MAC CE to the mobile communication device 110, which indicates activation of another SCell with configured uplink, say SCell#1, and also indicates activation of the already activated SCell#2 to keep SCell#2 activated (step S320). In this embodiment, the controller module 112 only ignores the Activation/Deactivation MAC CE for SCell#2 when the accumulated number of the Activation/Deactivation MAC CE indicating activation of an already activated SCell is greater than or equal to a predetermined number. The predetermined number may be any integer greater than or equal to 1, but preferably no more than 3. In this embodiment, the predetermined number is set to 2, but the invention is not limited thereto. Since this Activation/Deactivation MAC CE is the first one indicating activation of an already activated SCell, the controller module 112 does not ignore the Activation/Deactivation MAC CE for SCell#2. That is, the controller module 112 restarts the deactivation timer associated with SCell#2 (step S325).

The controller module 112 continues to handle the Activation/Deactivation MAC CE for SCell#1. Specifically, the controller module 112 activates SCell#1 and starts the deactivation timer associated with SCell#1 (step S330). In response to the activation of SCell#1 and the reactivation of SCell#2, the controller module 112 triggers the PHR procedure and starts the prohibition timer for the PHR procedure (step S335). Next, when the service network 120 detects that a smaller transmission bandwidth is required for the mobile communication device 110, it transmits an Activation/Deactivation MAC CE to the mobile communication device 110, which indicates deactivation of SCell#1 and activation of the already activated SCell#2 to keep SCell#2 activated (step S340). Due to the fact that the accumulated number of the Activation/Deactivation MAC CE indicating activation of an already activated SCell is equal to the predetermined number of 2, the controller module 112 ignores the Activation/Deactivation MAC CE for SCell#2, which re-activates SCell#2 (step S345). In other words, the deactivation timer associated with SCell#2 is not restarted. After that, the controller module 112 continues to handle the Activation/Deactivation MAC CE for SCell#1 by deactivating SCell#1 and stopping the deactivation timer associated with SCell#1 (step S350). Note that, the controller module 112 ignores the Activation/Deactivation MAC CE for the already activated SCell when the accumulated number of the Activation/Deactivation MAC CE indicating activation of an already activated SCell is greater than or equal to a predetermined number, so that unnecessary prolonging of the activation period of the already activated SCell may be subject to control and the PHR procedure triggered by an Activation/Deactivation MAC CE indicating activation of an already activated SCell does not always exclude other PHR trigger events through the PHR prohibition timer running (especially the PHR trigger events that are useful to the UE scheduler).

Figure 4A:
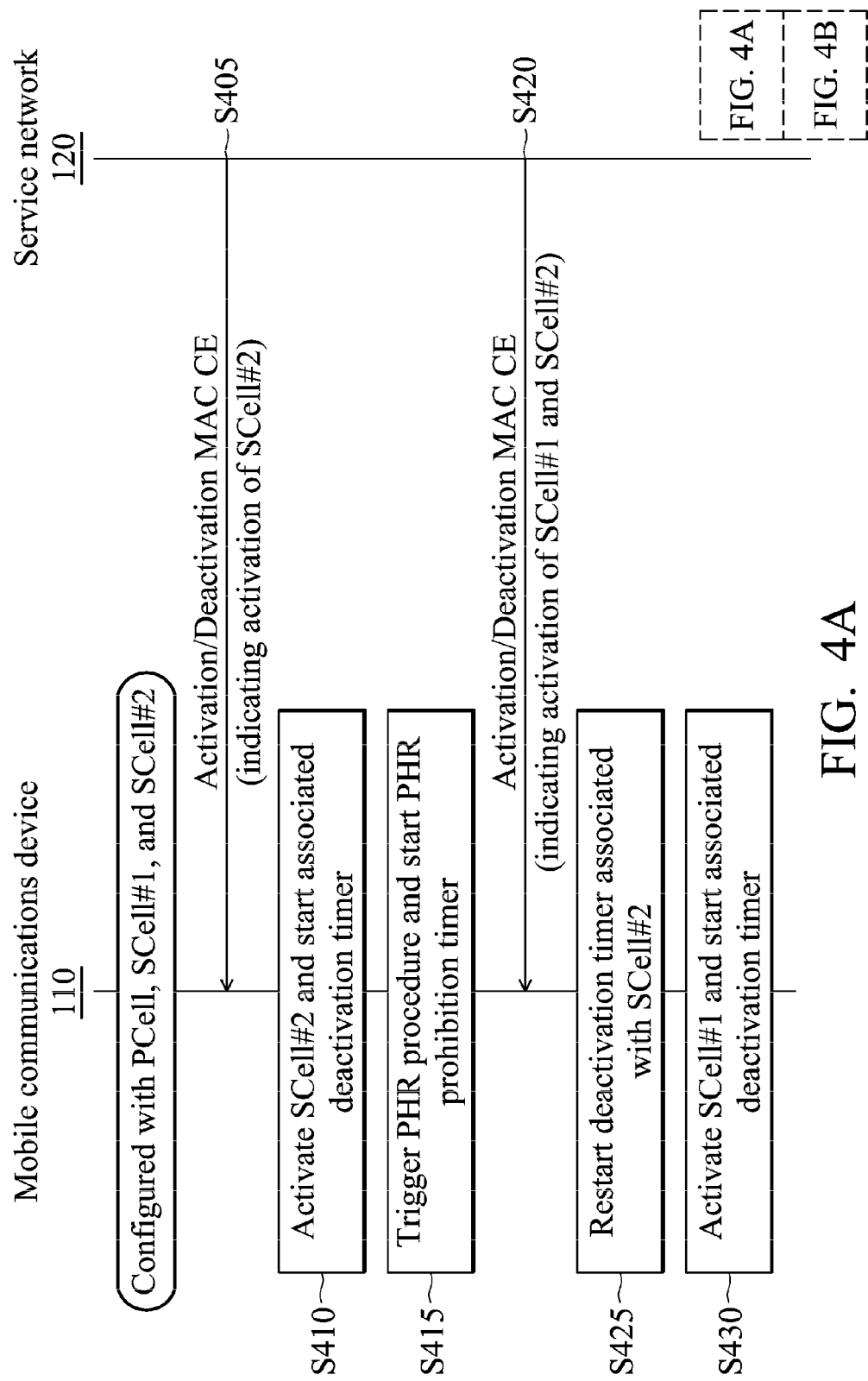
FIGS. 4A and 4B show a message sequence chart illustrating the handling of the SCell reactivation according to yet another embodiment of the invention.
Figure 4B:
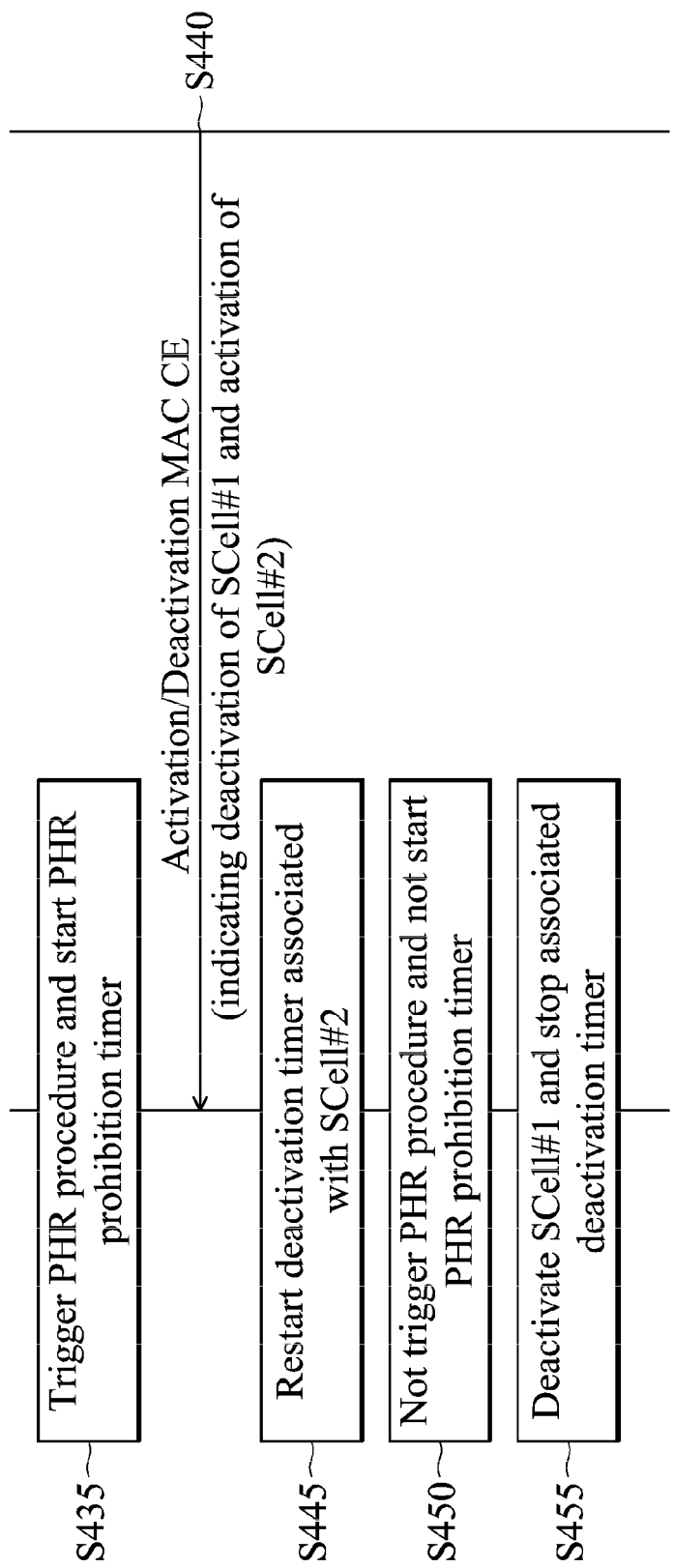

FIGS. 4A and 4B show a message sequence chart illustrating the handling of the SCell reactivation according to yet another embodiment of the invention. Similar to FIGS. 2A and 2B, one CC is configured as the PCell and two CCs are configured as the SCells with uplink (denoted as SCell#1 and SCell#2) for the wireless communications device 110, and the PCell is always activated while SCell#1 and SCell#2 are initially deactivated. When the service network 120 detects that a larger transmission bandwidth is required for the mobile communication device 110, it transmits an Activation/Deactivation MAC CE indicating activation of an SCell with configured uplink, say SCell#2, to the mobile communication device 110 (step S405). When receiving the Activation/Deactivation MAC CE, the controller module 112 activates SCell#2 and starts the deactivation timer associated with SCell#2 (step S410). Meanwhile, the controller module 112 also triggers the PHR procedure and starts the prohibition timer for the PHR procedure (step S415). During the running period of the PHR prohibition timer, the mobile communication device 110 is forbidden to perform the PHR procedure, so as to avoid frequent triggering of the PHR procedure. Subsequently, the service network 120 detects that a larger transmission bandwidth is again required for the mobile communication device 110. Since the format design of the Activation/Deactivation MAC CE only provides control of the SCell with either activation or deactivation, the service network 120 has no choice but to transmit another Activation/Deactivation MAC CE to the mobile communication device 110, which indicates activation of another SCell with configured uplink, say SCell#1, and also indicates activation of the already activated SCell#2 to keep SCell#2 activated (step S420). Note that, in this embodiment, the controller module 112 does not reset the prohibition timer for the PHR procedure, unless the Activation/Deactivation MAC CE also activates another deactivated SCell. In response to the Activation/Deactivation MAC CE indicating activation of the already activated SCell#2, the controller module 112 restarts the deactivation timer associated with SCell#2 (step S425). In addition, due to the fact that the second Activation/Deactivation MAC CE is used for activation of the originally deactivated SCell#1, the controller module 112 activates SCell#1 and starts the deactivation timer associated with SCell#1 (step S430), and then triggers the PHR procedure and starts the prohibition timer for the PHR procedure (step S435). Next, when the service network 120 detects that a smaller transmission bandwidth is required for the mobile communication device 110, it transmits an Activation/Deactivation MAC CE to the mobile communication device 110, which indicates deactivation of SCell#1 and activation of the already activated SCell#2 to keep SCell#2 activated (step S440). In response to the Activation/Deactivation MAC CE indicating activation of the already activated SCell#2, the controller module 112 restarts the deactivation timer associated with SCell#2 (step S445). Due to the fact that the Activation/Deactivation MAC CE is used for deactivation of SCell#1 only and is irrelevant to SCell#2, the controller module 112 does not trigger the PHR procedure and does not start the prohibition timer for the PHR procedure (step S450), so that the PHR procedure triggered by an Activation/Deactivation MAC CE indicating activation of an already activated SCell does not exclude other PHR trigger events through the PHR prohibition timer running (especially the PHR trigger events that are useful to the UE scheduler). After that, the controller module 112 continues to handle the Activation/Deactivation MAC CE for SCell#1 by deactivating SCell#1 and stopping the deactivation timer associated with SCell#1 (step S455).

Figure 5A:
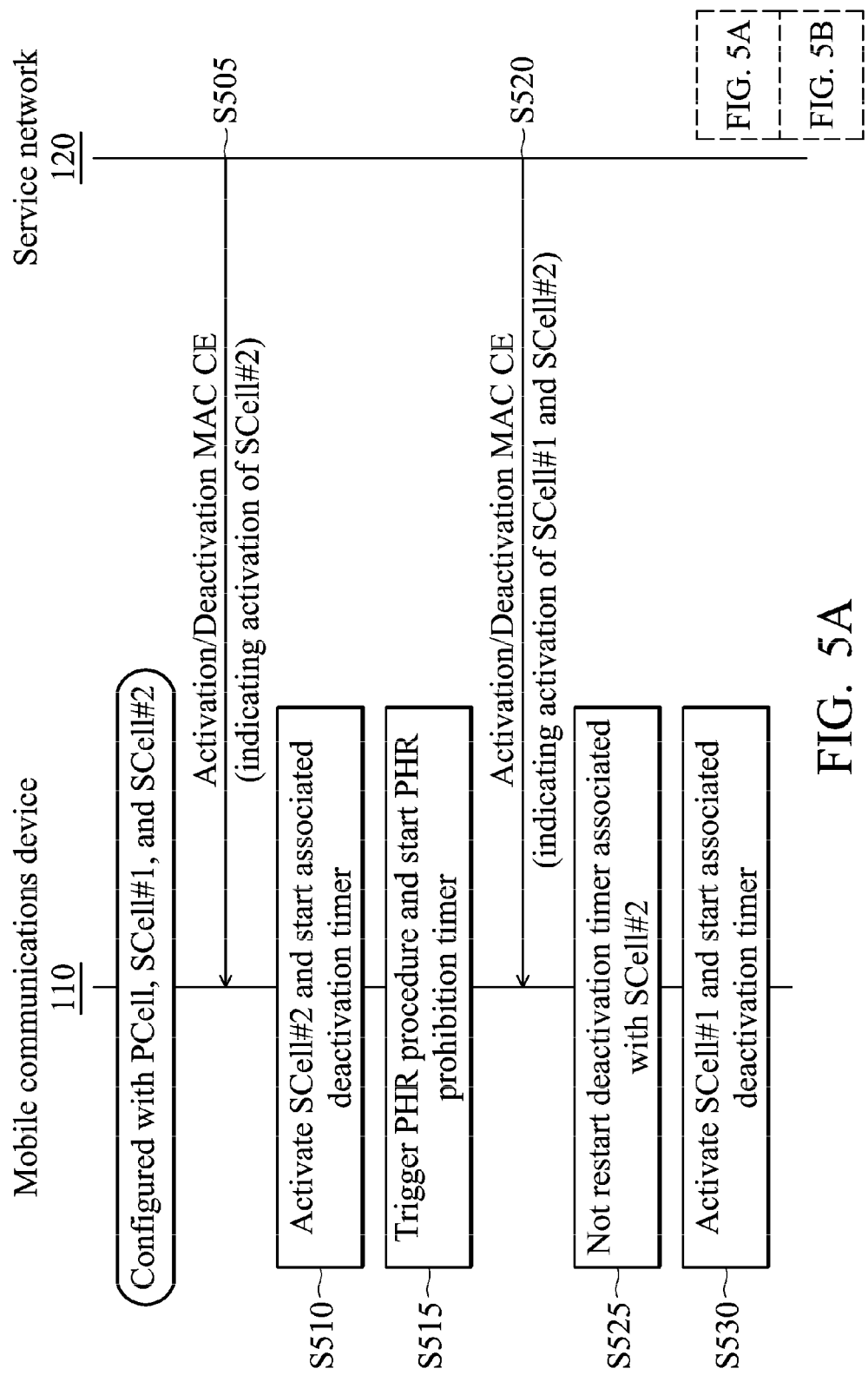
FIGS. 5A and 5B show a message sequence chart illustrating the handling of the SCell reactivation according to still another embodiment of the invention.
Figure 5B:
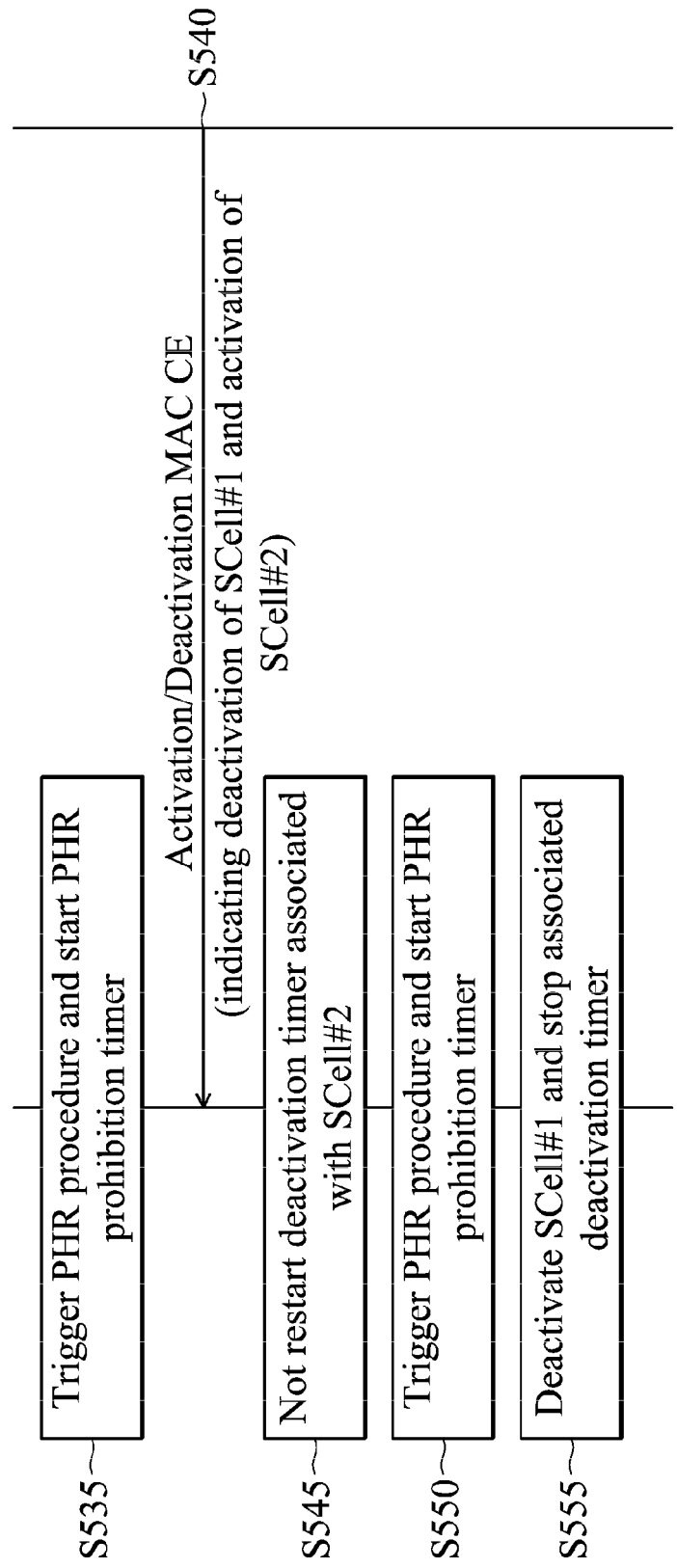

FIGS. 5A and 5B show a message sequence chart illustrating the handling of the SCell reactivation according to still another embodiment of the invention. Similar to FIGS. 2A and 2B, one CC is configured as the PCell and two CCs are configured as the SCells with uplink (denoted as SCell#1 and SCell#2) for the wireless communications device 110, and the PCell is always activated while SCell#1 and SCell#2 are initially deactivated. When the service network 120 detects that a larger transmission bandwidth is required for the mobile communication device 110, it transmits an Activation/Deactivation MAC CE indicating activation of an SCell with configured uplink, say SCell#2, to the mobile communication device 110 (step S505). When receiving the Activation/Deactivation MAC CE, the controller module 112 activates SCell#2 and starts the deactivation timer associated with SCell#2 (step S510). Meanwhile, the controller module 112 also triggers the PHR procedure and starts the prohibition timer for the PHR procedure (step S515). During the running period of the PHR prohibition timer, the mobile communication device 110 is forbidden to perform the PHR procedure, so as to avoid frequent triggering of the PHR procedure. Subsequently, the service network 120 detects that a larger transmission bandwidth is again required for the mobile communication device 110. Since the format design of the Activation/Deactivation MAC CE only provides control of the SCell with either activation or deactivation, the service network 120 has no choice but to transmit another Activation/Deactivation MAC CE to the mobile communication device 110, which indicates activation of another SCell with configured uplink, say SCell#1, and also indicates activation of the already activated SCell#2 to keep SCell#2 activated (step S520). In response to the Activation/Deactivation MAC CE indicating activation of the already activated SCell#2, the controller module 112 does not restart the deactivation timer associated with SCell#2 (step S525), so that unnecessary prolonging of the activation period of SCell#2 may be avoided. In addition, due to the fact that the second Activation/Deactivation MAC CE is used for activation of the originally deactivated SCell#1, the controller module 112 activates SCell#1 and starts the deactivation timer associated with SCell#1 (step S530), and then triggers the PHR procedure and starts the prohibition timer for the PHR procedure (step S535). Next, when the service network 120 detects that a smaller transmission bandwidth is required for the mobile communication device 110, it transmits an Activation/Deactivation MAC CE to the mobile communication device 110, which indicates deactivation of SCell#2 and activation of the already activated SCell#2 to keep SCell#2 activated (step S540). In response to the Activation/Deactivation MAC CE indicating activation of the already activated SCell#2, the controller module 112 does not restart the deactivation timer associated with SCell#2 (step S545), and then triggers the PHR procedure and starts the prohibition timer for the PHR procedure (step S550). After that, the controller module 112 continues to handle the Activation/Deactivation MAC CE for SCell#1 by deactivating SCell#1 and stopping the deactivation timer associated with SCell#1 (step S555).

Figure 6:
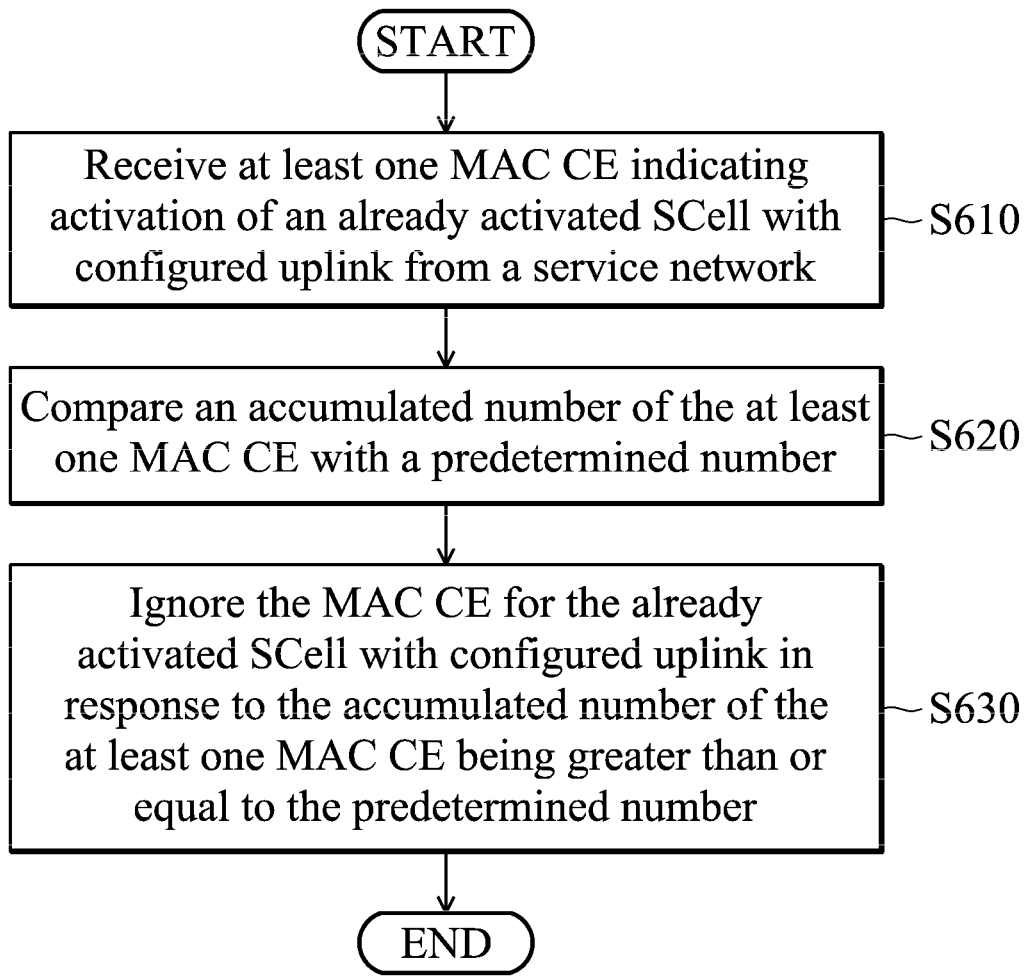
FIG. 6 is a flow chart illustrating a method for handling SCell reactivation according to an embodiment of the invention.

FIG. 6 is a flow chart illustrating a method for handling SCell reactivation according to an embodiment of the invention. The method for handling SCell reactivation may be applied to any mobile communication device supporting the CA technique and the LTE/LTE-Advanced technology, such as the mobile communication device 110 in FIG. 1. Specifically, the mobile communication device is wireless connected to a service network for obtaining wireless services, wherein the service network also supports the CA technique. In this embodiment, there are one PCell and a plurality of SCells configured for the mobile communication device, and at least one of the SCells is activated. To begin the method, the mobile communication device receives at least one MAC CE indicating activation of an already activated SCell with configured uplink from the service network (step S610). The MAC CE may be an Activation/Deactivation MAC CE. Subsequently, the mobile communication device compares the accumulated number of the at least one MAC CE with a predetermined number (step S620). Next, the mobile communication device ignores the MAC CE for the already activated SCell with configured uplink in response to the accumulated number of the at least one MAC CE being greater than or equal to the predetermined number (step S630). Note that, the predetermined number may be any integer greater than or equal to 1, but preferably no more than 3. For example, if the predetermined number is set to 1, the mobile communication device may ignore each of the at least one MAC CE for the already activated SCell with configured uplink. If the predetermined number is set to 2, the mobile communication device may tolerate one reactivation of the already activated SCell, i.e., the mobile communication device may handle the MAC CE for the already activated SCell with configured uplink by triggering the PHR procedure, starting the prohibition timer for the PHR procedure, and restarting the deactivation associated with the already activated SCell, for only once, and then ignore any subsequent MAC CE indicating activation of an already activated SCell with configured uplink, for the already activated SCell with configured uplink. Thus, unnecessary prolonging of the activation period of the already activated SCell may be subject to control, and the PHR procedure triggered by an MAC CE indicating activation of an already activated SCell with configured uplink does not always exclude other PHR trigger events (especially the PHR trigger events that are useful to the UE scheduler).

Figure 7:
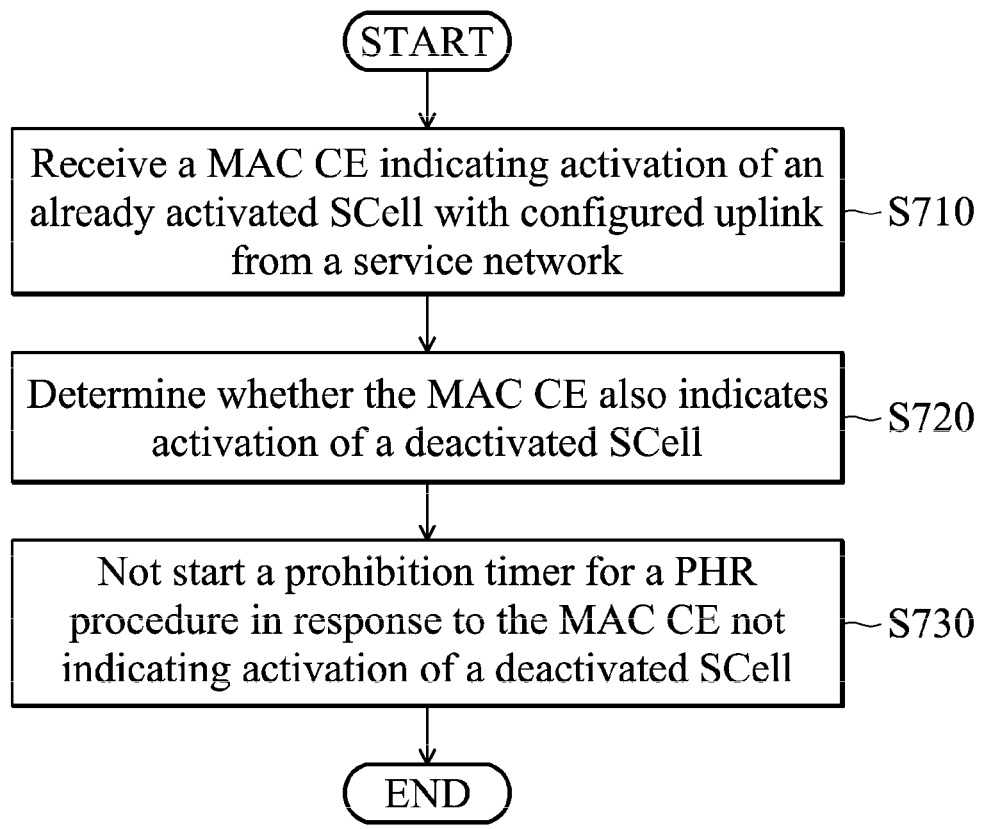
FIG. 7 is a flow chart illustrating a method for handling SCell reactivation according to another embodiment of the invention.

FIG. 7 is a flow chart illustrating a method for handling SCell reactivation according to another embodiment of the invention. Similar to FIG. 6, the method for handling SCell reactivation may be applied to any mobile communication device supporting the CA technique and the LTE/LTE-Advanced technology, such as the mobile communication device 110 in FIG. 1. Specifically, the mobile communication device is wireless connected to a service network for obtaining wireless services, wherein the service network also supports the CA technique. In this embodiment, there are one PCell and a plurality of SCells configured for the mobile communication device, and at least one of the SCells is activated. To begin the method, the mobile communication device receives a MAC CE indicating activation of an already activated SCell with configured uplink from the service network (step S710). The MAC CE may be an Activation/Deactivation MAC CE. Subsequently, the mobile communication device determines whether the MAC CE also indicates activation of a deactivated SCell (step S720). Next, the mobile communication device does not start a prohibition timer for a PHR procedure in response to the MAC CE not indicating activation of a deactivated SCell (step S730). Note that, the mobile communication device does not start the prohibition timer for the PHR procedure, unless the MAC CE also indicates activation of another deactivated SCell. In other words, the mobile communication device starts the prohibition timer for the PHR procedure if the MAC CE only indicates activation of an already activated SCell with configured uplink. Thus, the PHR procedure triggered by a MAC CE indicating activation of an already activated SCell with configured uplink does not exclude other PHR trigger events through the PHR prohibition timer running (especially the PHR trigger events that are useful to the UE scheduler).

Figure 8:
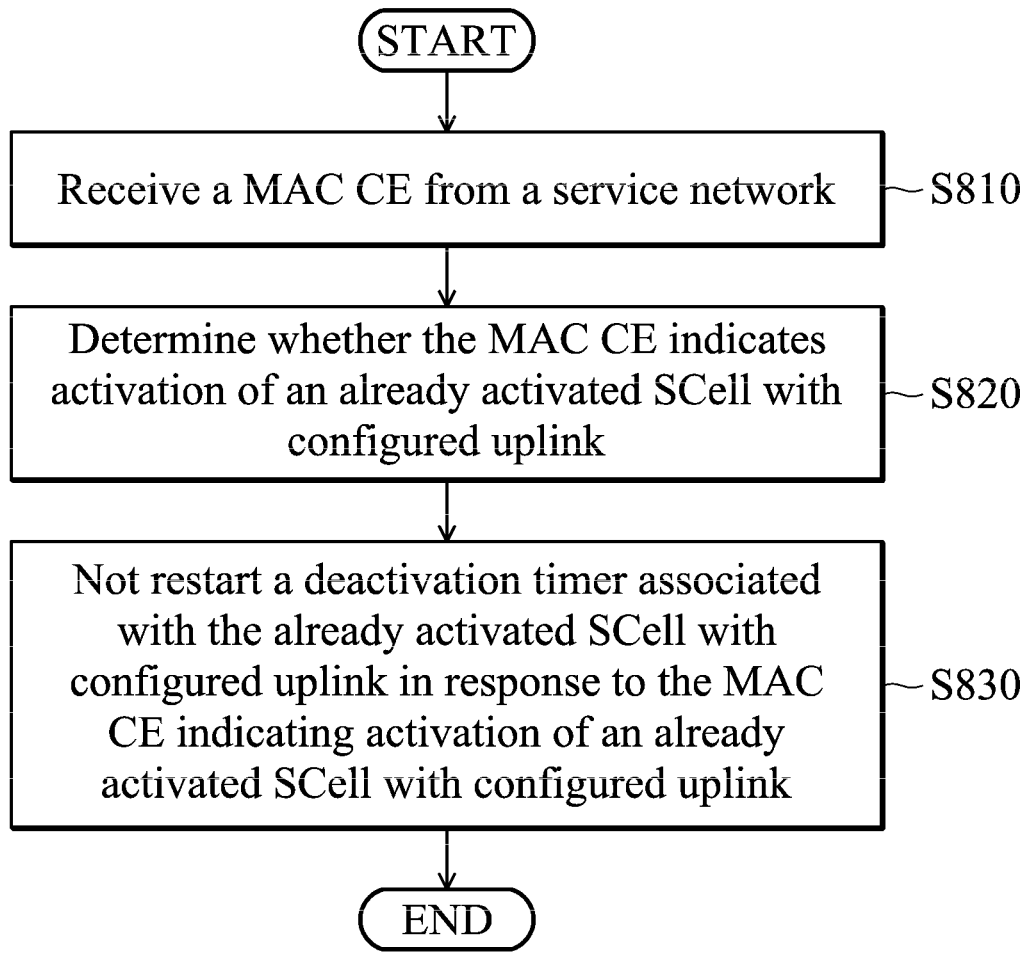
FIG. 8 is a flow chart illustrating a method for handling SCell reactivation according to another embodiment of the invention.

FIG. 8 is a flow chart illustrating a method for handling SCell reactivation according to another embodiment of the invention. Similar to FIG. 6, the method for handling SCell reactivation may be applied to any mobile communication device supporting the CA technique and the LTE/LTE-Advanced technology, such as the mobile communication device 110 in FIG. 1. Specifically, the mobile communication device is wireless connected to a service network for obtaining wireless services, wherein the service network also supports the CA technique. In this embodiment, there are one PCell and a plurality of SCells configured for the mobile communication device, and at least one of the SCells is activated. To begin the method, the mobile communication device receives a MAC CE from the service network (step S810). Subsequently, the mobile communication device determines whether the MAC CE indicates activation of an already activated SCell with configured uplink (step S820). Next, the mobile communication device does not restart a deactivation timer associated with the already activated SCell with configured uplink in response to the MAC CE indicating activation of an already activated SCell with configured uplink (step S830). Since the deactivation timer associated with an already activated SCell does not get restarted when a MAC CE indicates activation of the already activated SCell with configured uplink is received, unnecessary prolonging of the activation period of the already activated SCell may be avoided.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling SCell reactivation may also be applied to mobile communication devices in compliance with any evolutionary technology of the LTE/LTE-Advanced technology. Therefore, the scope of the invention shall be defined and protected by the following claims and their equivalents.

What is claimed is:

1. A method for handling Secondary Cell (SCell) reactivation by a mobile communication device supporting a Carrier Aggregation (CA) technique, comprising:
   receiving a Media Access Control (MAC) Control Element (CE) indicating activation of an already activated SCell with configured uplink from a service network;
   determining whether the MAC CE also indicates activation of a deactivated SCell; and
   not starting a prohibition timer for a Power Headroom Reporting (PHR) procedure in response to the MAC CE not indicating activation of the deactivated SCell.

2. A method for handling Secondary Cell (SCell) reactivation by a mobile communication device supporting a Carrier Aggregation (CA) technique, comprising:
   receiving a Media Access Control (MAC) Control Element (CE) from a service network;
   determining whether the MAC CE indicates activation of an already activated SCell with configured uplink; and
   not restarting a deactivation timer associated with the already activated SCell with configured uplink in response to the MAC CE indicating activation of the already activated SCell with configured uplink.

* * * * *